(12) United States Patent
Chin

(10) Patent No.: US 11,467,432 B2
(45) Date of Patent: Oct. 11, 2022

(54) MULTIFUNCTIONAL EYEGLASS DEVICE

(71) Applicant: SILICON TOUCH TECHNOLOGY INC., Hsinchu (TW)

(72) Inventor: Chi-Yuan Chin, Hsinchu (TW)

(73) Assignee: SILICON TOUCH TECHNOLOGY INC., Hsinchu (TW)

( * ) Notice: Subject to any disclaimer, the term of this patent is extended or adjusted under 35 U.S.C. 154(b) by 379 days.

(21) Appl. No.: 16/891,266

(22) Filed: Jun. 3, 2020

(65) Prior Publication Data

US 2020/0409185 A1 Dec. 31, 2020

(30) Foreign Application Priority Data

Jun. 26, 2019 (TW) ................................. 108122252

(51) Int. Cl.
*G02C 11/00* (2006.01)
*G02B 27/01* (2006.01)

(52) U.S. Cl.
CPC .......... *G02C 11/10* (2013.01); *G02B 27/0172* (2013.01); *G02B 2027/0178* (2013.01)

(58) Field of Classification Search
CPC ........ G02B 2027/0178; G02B 27/0172; G02B 27/017; G02B 27/01; G02C 11/10; G02C 11/00
USPC ........................................................ 351/158
See application file for complete search history.

(56) References Cited

U.S. PATENT DOCUMENTS

| 5,114,218 A | 5/1992 | Xie et al. | |
| 10,529,138 B2* | 1/2020 | Schowengerdt | G02B 27/01 |
| 11,300,844 B2* | 4/2022 | Schowengerdt | G02F 1/29 |
| 2013/0300635 A1 | 11/2013 | White et al. | |
| 2015/0005606 A1 | 1/2015 | Honore et al. | |
| 2017/0176818 A1* | 6/2017 | Shi | G02F 1/137 |
| 2018/0084245 A1* | 3/2018 | Lapstun | H04N 13/315 |
| 2018/0252925 A1* | 9/2018 | Schowengerdt | G06T 15/506 |
| 2019/0113758 A1* | 4/2019 | Cho | G03H 1/0808 |
| 2021/0157151 A1 | 5/2021 | Xie et al. | |
| 2021/0240018 A1* | 8/2021 | Schowengerdt | G02B 6/0056 |

FOREIGN PATENT DOCUMENTS

| CN | 2596380 Y | 12/2003 |
| CN | 1856728 A | 11/2006 |
| CN | 202057915 U | 11/2011 |
| CN | 104407439 A | 3/2015 |

(Continued)

*Primary Examiner* — William R Alexander
(74) *Attorney, Agent, or Firm* — Li & Cai Intellectual Property (USA) Office

(57) ABSTRACT

A multifunctional eyeglass device includes a control module, a lens group, a power supply module, a storage module, a communication module, and a frame. The lens group includes a first lens module and a second lens module, the first lens module includes a first liquid crystal lens unit and a first display unit, and the second lens module includes a second liquid crystal lens unit and a second display unit. The control module is electrically connected to the first and second lens module of the lens group, the power supply module, the storage module, and the communication module. The first and second liquid crystal lens units are adjusted in focal length according to at least one power source. The control module receives data via the communication module, and the data is displayed by the first and second display unit.

11 Claims, 6 Drawing Sheets

FIG. 1

(56) References Cited

FOREIGN PATENT DOCUMENTS

| | | |
|---|---|---|
| CN | 204269949 U | 4/2015 |
| CN | 204462566 U | 7/2015 |
| CN | 105572877 A | 5/2016 |
| CN | 109633905 A | 4/2019 |
| TW | I531178 B | 4/2016 |
| TW | I547720 B | 9/2016 |
| TW | I613461 B | 2/2018 |

* cited by examiner

MULTIFUNCTIONAL EYEGLASS DEVICE

CROSS-REFERENCE TO RELATED PATENT APPLICATION

This application claims the benefit of priority to Taiwan Patent Application No. 108122252, filed on Jun. 26, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to eyeglasses, and more particularly to a multifunctional eyeglass device.

BACKGROUND OF THE DISCLOSURE

The curvature of lenses is an important feature in conventional eyeglasses because of differences in vision among users. Since lenses required by users with poor vision are usually thicker and heavier, it is inconvenient for the users to wear them. In addition, if there is a difference in vision between the left and right eyes, it would be difficult to design an excellent eyeglass combining proper weight distribution and an aesthetic appearance.

Therefore, how to provide an eyeglass device having aesthetic appearance and adjustable power is a significant subject in the field.

SUMMARY OF THE DISCLOSURE

In response to the above-referenced technical inadequacies, the present disclosure provides a multifunctional eyeglass device. The device includes: a control module, a lens group, a power supply module, a storage module, a communication module, and a frame, where the lens group includes a first lens module and a second lens module, the first lens module includes a first liquid crystal lens unit and a first display unit, and the second lens module includes a second liquid crystal lens unit and a second display unit; the control module is electrically connected to the first lens module and the second lens module of the lens group; the power supply module, the storage module, and the communication module; the control module, the first lens module, the second lens module, the power supply module, the storage module, and the communication module are all disposed on the frame; the power supply module supplies a power source to the control module, the first lens module, the second lens module, the storage module, and the communication module; the power supply module supplies at least one power source to the first liquid crystal lens unit of the first lens module and the second liquid crystal lens unit of the second lens module, and the first liquid crystal lens unit and the second liquid crystal lens unit are adjusted in focal length according to the at least one power source; and the control module receives data via the communication module, and the data is displayed by the first display unit and the second display unit.

The present disclosure has the following advantageous effects: by using liquid crystal lenses capable of reducing the entire size as the main design, the multifunctional eyeglass device provided by the present disclosure includes lens modules that are thin and light. Even if the two eyes of a user have different strengths of vision, the first lens module and the second lens module can still be easily adjusted to suit the requirement of the user. Moreover, the multifunctional eyeglass device of the present disclosure further has an image magnification or shrinkage function, and can further display different information and map data, so that various types of data in a wearable device, a cloud server, and an on-board computer can be integrated and displayed on the multifunctional eyeglass device.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
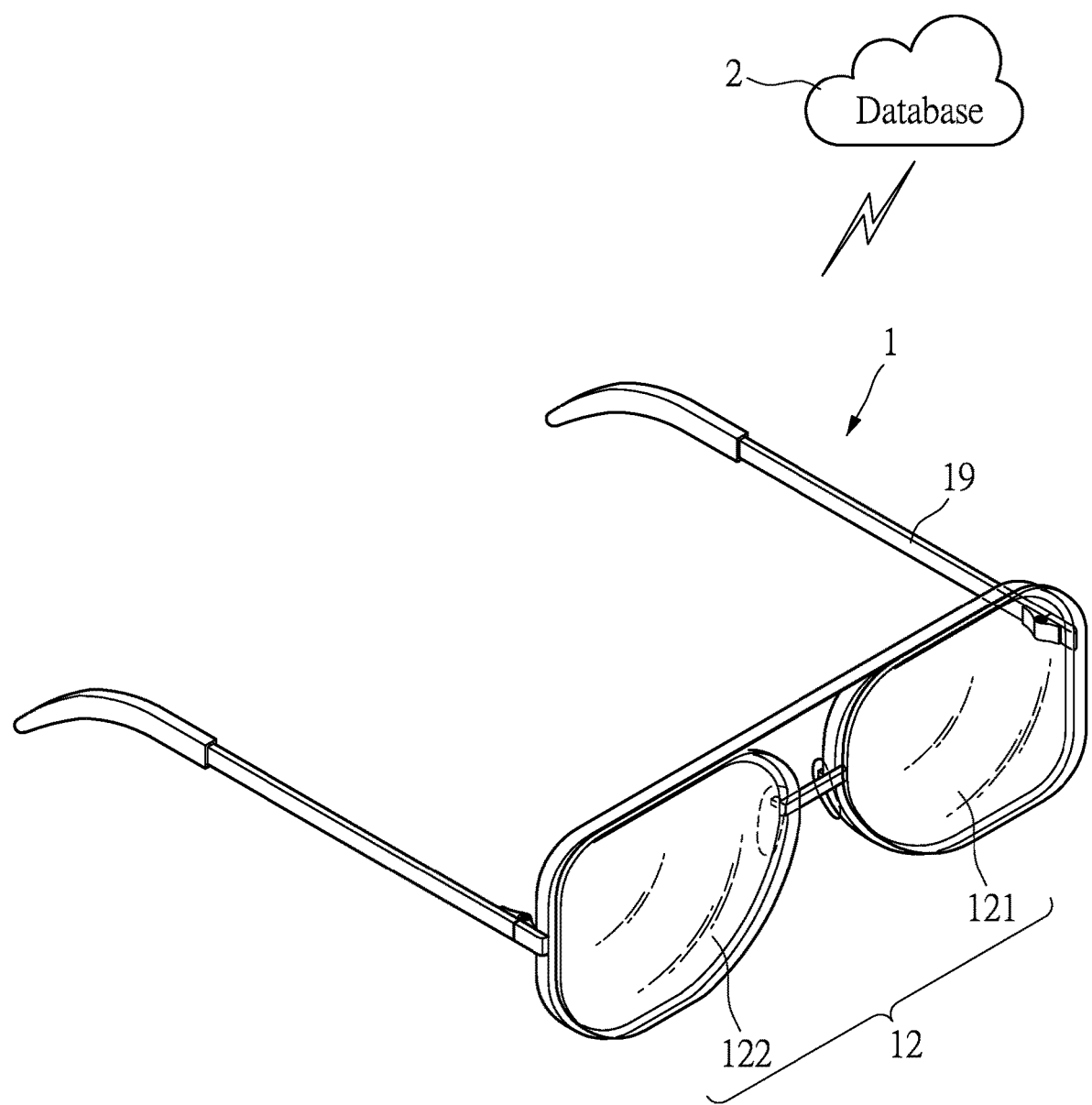
FIG. 1 is a schematic view of a multifunctional eyeglass device in an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The following describes an implementation manner of the present disclosure relating to a "multifunctional eyeglass device" through a specific embodiment. Those skilled in the art can easily understand the advantages and effects of the present disclosure from the content disclosed in the specification. The present disclosure can be embodied or applied through other different embodiments. Based on different opinions and applications, the details in the present specification can also be modified and changed without departing from the concept of the present disclosure. In addition, it should be stated first that the accompanying drawings of the present disclosure are merely for brief illustration and not drawn according to actual dimensions. The following embodiments will further explain the related technical content of the present disclosure, but the disclosed content is not intended to limit the scope of protection of the present disclosure.

It should be understood that, although the terms "first", "second", "third", and the like are probably used herein to describe various elements or signals, these elements or signals should not be limited by these terms. The use of these terms only aims to distinguish one element from another or one signal from another. In addition, the term "or" as used herein shall, according to the actual situation, include any one or a combination of more of the associated listed items.

First Embodiment

Figure 2:
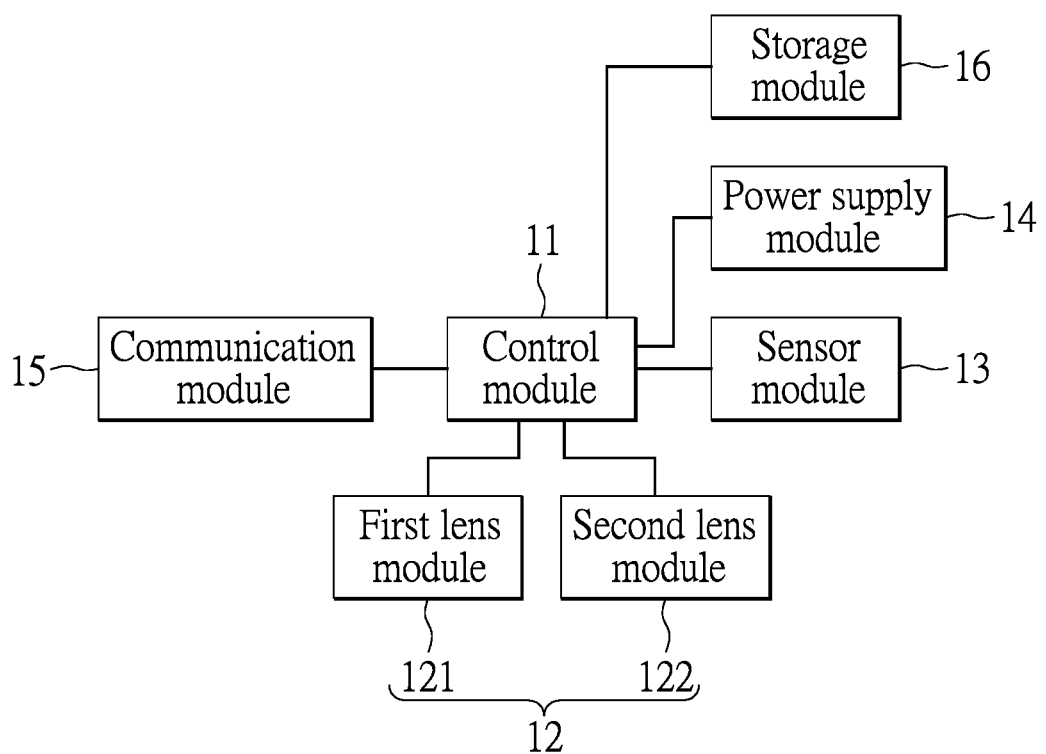
FIG. 2 is a block diagram of the multifunctional eyeglass device in the embodiment of the present disclosure.
Figure 3:
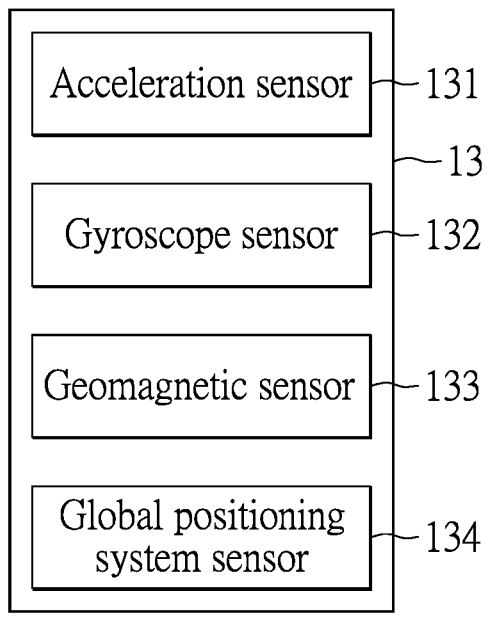
FIG. 3 is a block diagram of a sensor module in the embodiment of the present disclosure.
Figure 4:
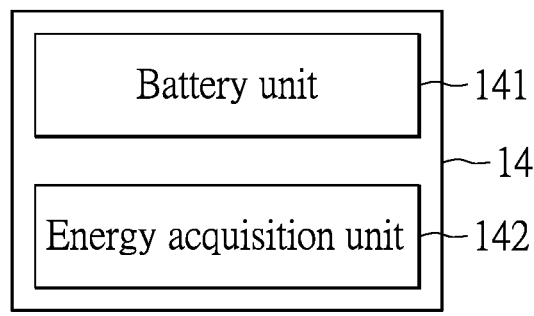
FIG. 4 is a block diagram of a power supply module in the embodiment of the present disclosure.
Figure 5:
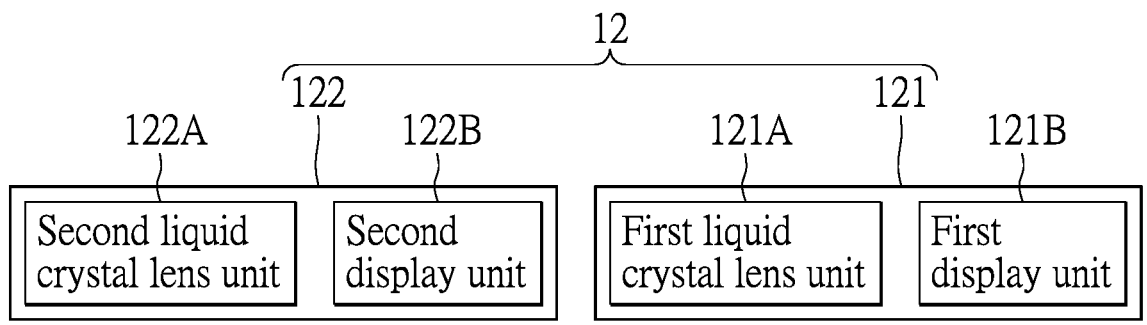
FIG. 5 is a block diagram of a first lens module and a second lens module in the embodiment of the present disclosure.

Referring to FIGS. 1, 2, 3, 4, and 5, FIG. 1 is a schematic view of a multifunctional eyeglass device in an embodiment of the present disclosure; FIG. 2 is a block diagram of the multifunctional eyeglass device in the embodiment of the present disclosure; FIG. 3 is a block diagram of a sensor module in the embodiment of the present disclosure; FIG. 4 is a block diagram of a power supply module in the embodiment of the present disclosure; and FIG. 5 is a block diagram of a first lens module and a second lens module in the embodiment of the present disclosure.

The multifunctional eyeglass device 1 includes a control module 11, a lens group 12, a sensor module 13, a power supply module 14, a communication module 15, a storage module 16, and a frame 19. The lens group 12 includes a first lens module 121 and a second lens module 122.

The control module 11 is electrically connected to the first lens module 121 and the second lens module 122 of the lens group 12, the sensor module 13, the power supply module 14, the communication module 15, and the storage module 16.

The first lens module 121 includes a first liquid crystal lens unit 121A and a first display unit 121B, and the second lens module 122 includes a second liquid crystal lens unit 122A and a second display unit 122B.

The control module 11, the first lens module 121, the second lens module 122, the power supply module 14, the storage module 16, and the communication module 15 are all disposed on the frame 19.

The power supply module 14 supplies a power source to the control module 11, the first lens module 121, the second lens module 122, the sensor module 13, the storage module 16, and the communication module 15.

The first liquid crystal lens unit 121A and the second liquid crystal lens unit 122A are adjusted in focal length according to the power source supplied by the power supply module 14. In this embodiment, the first liquid crystal lens unit 121A and the second liquid crystal lens unit 122A respectively include a plurality of liquid crystal lenses. One or two of the plurality of liquid crystal lenses in the first liquid crystal lens unit 121A and the second liquid crystal lens unit 122A may be used as vision adjustment lenses for a user. After a voltage is applied on the liquid crystal lenses of the first liquid crystal lens unit 121A and the second liquid crystal lens unit 122A, a graded electric field is formed, which diverts liquid crystal molecules.

In this embodiment, the storage module 16 stores a focusing program. First, a user is provided with a focusing image and a focusing procedure to test whether a vision condition of the user is myopia, hyperopia, presbyopia, astigmatism, or the like, to generate individual focusing data. Afterwards, the control module 11 provides a corresponding control voltage to the first liquid crystal lens unit 121A and the second liquid crystal lens unit 122A according to the individual focusing data, so as to set a lens focal length suitable for the user. Moreover, the multifunctional eyeglass device 1 of this embodiment can be used to give a focusing test to a plurality of users, and the focal length is adjusted. That is to say, after being tested by the focusing program, each user obtains individual focusing data. Further, the individual focusing data of the users is stored in the storage module 16, and any user can retrieve his/her personal focusing data from the storage module 16 to set a suitable lens focal length.

The control module 11 receives data via the communication module 15. The data is displayed by the first display unit 121B and the second display unit 122B. For example, the communication module 15 is communicatively connected to a database 2 to receive map data. The control module 11 displays the map data on the first display unit 121B and the second display unit 122B, and the map data displayed by the first display unit 121B and the second display unit 122B has a certain degree of transparency. That is, when wearing the multifunctional eyeglass device 1, the user can see the map data on the first lens module 121 and the second lens module 122 in front of the eyes, and can also see the surroundings through the first lens module 121 and the second lens module 122.

In this embodiment, the first liquid crystal lens unit 121A and the first display unit 121B of the first lens module 121 are arranged adjacent to each other or are overlapped with each other, and the second liquid crystal lens unit 122A and the second display unit 122B of the second lens module 122 are also arranged adjacent to each other or are overlapped with each other. An adjustment or design may be made according to an actual requirement, which is not limited in the present disclosure. In addition, the first lens module 121 has a first thickness, and the second lens module 122 has a second thickness, where the first thickness is equal to the second thickness.

The sensor module 13 of the multifunctional eyeglass device 1 includes an acceleration sensor 131, a gyroscope sensor 132, a geomagnetic sensor 133, and a global positioning system sensor 134. In this embodiment, the acceleration sensor 131, the gyroscope sensor 132, the geomagnetic sensor 133, and the global positioning system sensor 134 are used to detect at least position information and direction information of the multifunctional eyeglass device 1, so as to perform navigation based on the map data.

Moreover, the power supply module 14 includes a battery unit 141 and an energy acquisition unit 142. The battery unit can receive electric power provided by a wireless charging module (not shown in the figures) or a wired charging module (not shown in the figures) for charging. The power supply module 14 and the communication module 15 can share a wired port, such as a micro universal serial port (micro USB), a Lightning port, or a type-C USB, for charging and data transmission, which is not limited in the present disclosure.

Moreover, when the user enters a vehicle (not shown in the figures) with the multifunctional eyeglass device 1, the communication module 15 of the multifunctional eyeglass device 1 is communicatively connected to an on-board computer in the vehicle (not shown in the figures). The control module 11 requests vehicle information from the on-board computer, and the on-board computer provides multiple pieces of vehicle information (for example, a tire pressure, a total amount of oil, a current temperature in the vehicle, mileage, and the like) of the vehicle (not shown in the figure) to the control module 11. The control module 11 displays the vehicle information on the first display unit 121B and the second display unit 122B. In this embodiment, when the vehicle is driven, different dynamic information of the vehicle may also be transmitted to the multifunctional eyeglass device via the on-board computer and be displayed.

Figure 6:
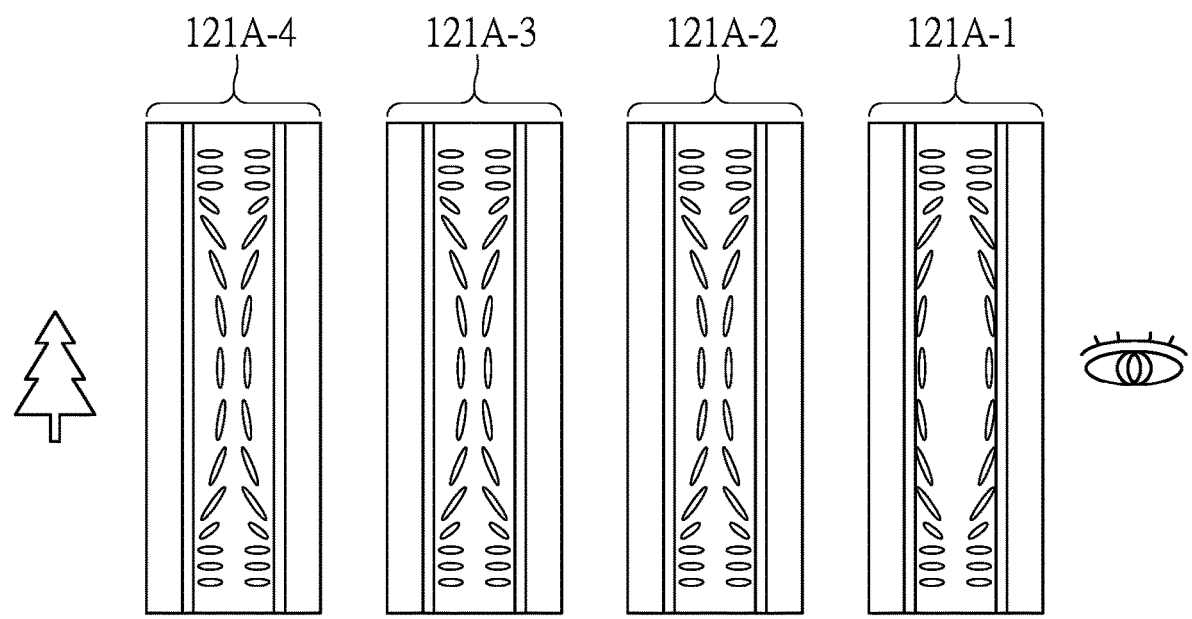
FIG. 6 is a schematic diagram of a first liquid crystal lens unit in the embodiment of the present disclosure.
Figure 7:
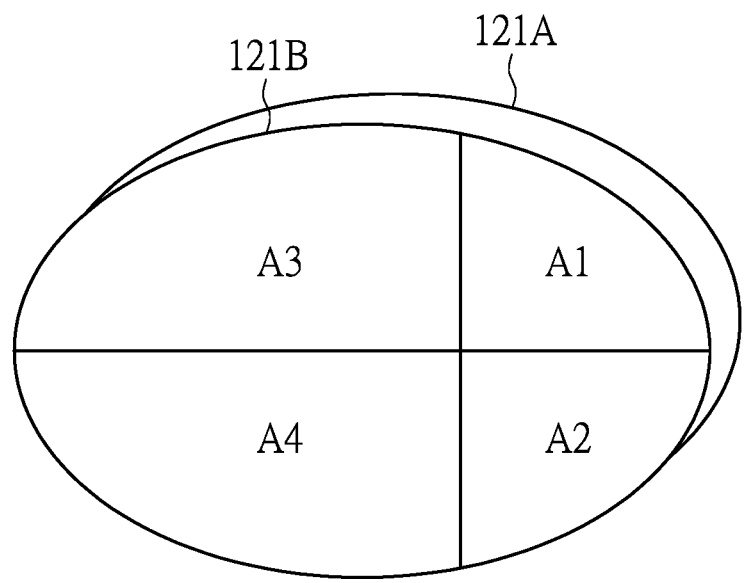
FIG. 7 is a schematic diagram showing a plurality of regions of a first display unit in the embodiment of the present disclosure.

Referring to FIG. 6 and FIG. 7, FIG. 6 is a schematic diagram of the first liquid crystal lens unit in the embodiment of the present disclosure; and FIG. 7 is a schematic diagram showing a plurality of regions of the first display unit in the embodiment of the present disclosure.

As shown in FIG. 6, the first liquid crystal lens unit 121A includes four liquid crystal lenses. In this embodiment, a first liquid crystal lens 121A-1 is used to improve vision of a user. That is, after the first liquid crystal lens 121A-1 is adjusted in focal length according to individual focusing data of a user, all parts of the lens unit are not changed in focal length and the focal length is maintained. In other embodiments, two liquid crystal lenses may be used to adjust the focal length according to the vision of the user. An adjustment or design may be made according to an actual requirement, which is not limited in the present disclosure. A second liquid crystal lens 121A-2, a third liquid crystal lens 121A-3, and a fourth liquid crystal lens 121A-4 are used to magnify or shrink image data. In this embodiment, several magnification or shrinkage parameters may be preset for the focal lengths of the second liquid crystal lens 121A-2, the third liquid crystal lens 121A-3, and the fourth liquid crystal lens 121A-4, so that the user can make a selection. The second liquid crystal lens 121A-2, the third liquid crystal lens 121A-3, and the fourth liquid crystal lens 121A-4 are adjustable in focal length, but relevant parameters may be preset. That is, the first liquid crystal lens unit 121A and the second liquid crystal lens unit 122A can magnify or shrink image data of a target object seen by the user.

Moreover, in this embodiment, the multifunctional eyeglass device 1 further includes a pupil tracking module (not shown in the figures) which is used to track pupil positions of the user, so as to magnify the image data displayed on the first display unit 121B and the second display unit 122B, or make a focal length adjustment. That is, any image data of a target object the user sees or focuses on can be magnified or shrunk.

As shown in FIG. 7, the first display unit 121B includes a first display region A1, a second display region A2, a third display region A3, and a fourth display region A4. In this embodiment, the first display region A1, the second display region A2, the third display region A3, and the fourth display region A4 respectively display different information. In FIG. 7, the first display unit 121B is disposed in front of the first liquid crystal lens unit 121A.

Figure 8:
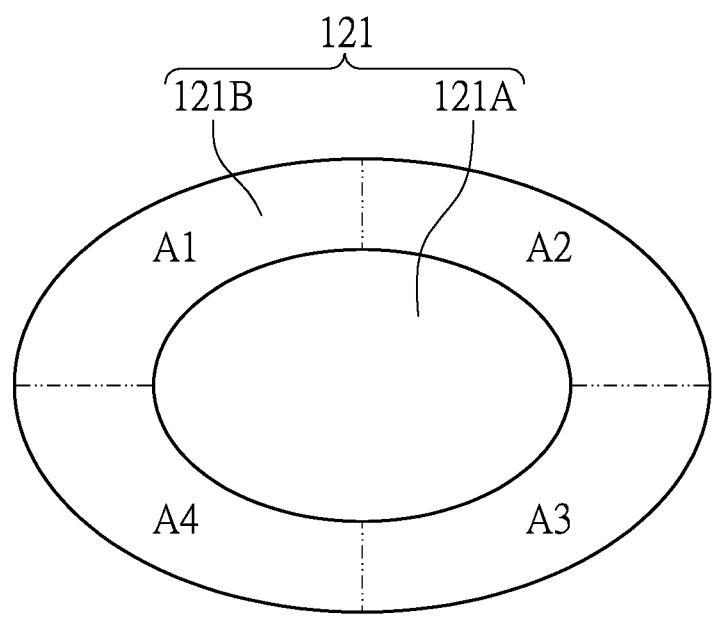
FIG. 8 is a schematic diagram showing that the first display unit is arranged around the first liquid crystal lens unit in the embodiment of the present disclosure.

Referring to FIG. 8, FIG. 8 is a schematic diagram showing that the first display unit is arranged around the first liquid crystal lens unit in the embodiment of the present disclosure.

In FIG. 8, the four display regions A1 to A4 of the first display unit 121B are arranged around the first liquid crystal lens unit 121A.

Advantageous Effects of the Embodiment

The present disclosure has the following advantageous effects: by using liquid crystal lenses capable of reducing the entire size as the main design, the multifunctional eyeglass device provided by the present disclosure includes lens modules that are thin and light. Even if the two eyes of a user have different strengths of vision, the first lens module and the second lens module can still be easily adjusted to suit the requirement of the user. Moreover, the multifunctional eyeglass device of the present disclosure further has an image magnification or shrinkage function, and can further display different information and map data, so that various types of data in a wearable device, a cloud server, and an on-board computer can be integrated and displayed on the multifunctional eyeglass device.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A multifunctional eyeglass device, comprising:
   a control module;
   a lens group including a first lens module and a second lens module, the first lens module including a first liquid crystal lens unit and a first display unit, and the second lens module including a second liquid crystal lens unit and a second display unit;
   a power supply module;
   a storage module;
   a communication module, wherein the control module being electrically connected to the first lens module and the second lens module of the lens group, the power supply module, the storage module, and the communication module; and a frame, wherein the control module, the first lens module, the second lens module, the power supply module, the storage module, and the communication module are all disposed on the frame; and the power supply module supplies a power source to the control module, the first lens module, the second lens module, the storage module, and the communication module;

wherein the power supply module supplies at least one power source to the first liquid crystal lens unit of the first lens module and the second liquid crystal lens unit of the second lens module, and the first liquid crystal lens unit and the second liquid crystal lens unit are adjusted in focal length according to the at least one power source;

wherein the control module receives data via the communication module, and the data is displayed by the first display unit and the second display unit.

2. The multifunctional eyeglass device of claim 1, wherein the storage module stores a focusing program which provides a focusing image and a focusing procedure to a plurality of users for a focal length adjustment, the users each have individual focusing data, and multiple pieces of individual focusing data are stored in the storage module; and the first liquid crystal lens unit and the second liquid crystal lens unit are configured according to the multiple pieces of individual focusing data.

3. The multifunctional eyeglass device of claim 1, wherein the communication module is communicatively connected to a database to receive map data;

and the control module displays the map data on the first display unit and the second display unit, the map data displayed by the first display unit and the second display unit having a certain degree of transparency.

4. The multifunctional eyeglass device of claim 1, wherein the first liquid crystal lens unit and the first display unit of the first lens module are arranged adjacent to each other or are overlapped with each other, and the second liquid crystal lens unit and the second display unit of the second lens module are also arranged adjacent to each other or are overlapped with each other.

5. The multifunctional eyeglass device of claim 1, wherein the first lens module has a first thickness, and the second lens module has a second thickness, the first thickness being equal to the second thickness.

6. The multifunctional eyeglass device of claim 1, further comprising:
 a sensor module, including:
  an acceleration sensor;
  a gyroscope sensor;
  a geomagnetic sensor; and
  a global positioning system sensor, wherein the acceleration sensor, the gyroscope sensor, the geomagnetic sensor, and the global positioning system sensor are used to at least detect position information and direction information of the multifunctional eyeglass device.

7. The multifunctional eyeglass device of claim 1, wherein the power supply module includes a battery unit and an energy acquisition unit, and the battery unit receives electric power provided by a wireless charging module or a wired charging module for charging.

8. The multifunctional eyeglass device of claim 1, wherein the control module is communicatively connected to an on-board computer in a vehicle via the communication module, the on-board computer provides the control module with multiple pieces of vehicle information of the vehicle, and the control module displays the multiple pieces of vehicle information on the first display unit and the second display unit.

9. The multifunctional eyeglass device of claim 1, further comprising: a pupil tracking module, used to track pupil positions of a user so as to magnify image data displayed on the first display unit and the second display unit or make a focal length adjustment.

10. The multifunctional eyeglass device of claim 9, wherein the first liquid crystal lens unit and the second liquid crystal lens unit are able to magnify or shrink the image data of a target object.

11. The multifunctional eyeglass device of claim 1, wherein the first display unit includes a first display region and a second display region which respectively display different information.

* * * * *